United States Patent
Koutsabeloulis et al.

(10) Patent No.: US 8,280,709 B2
(45) Date of Patent: Oct. 2, 2012

(54) FULLY COUPLED SIMULATION FOR FLUID FLOW AND GEOMECHANICAL PROPERTIES IN OILFIELD SIMULATION OPERATIONS

(75) Inventors: Nick Koutsabeloulis, Winkfield-Windsor (GB); Stephen Hope, Staines (GB); Andrew Pearce, Leatherhead (GB); Robert Newman, Bracknell (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 494 days.

(21) Appl. No.: 12/548,810

(22) Filed: Aug. 27, 2009

(65) Prior Publication Data

US 2010/0088076 A1  Apr. 8, 2010

Related U.S. Application Data

(60) Provisional application No. 61/102,716, filed on Oct. 3, 2008, provisional application No. 61/105,303, filed on Oct. 14, 2008.

(51) Int. Cl.
    *G06G 7/48* (2006.01)
(52) U.S. Cl. ......................................................... 703/10
(58) Field of Classification Search .................... 703/10; 702/13, 14, 18
    See application file for complete search history.

(56) References Cited

U.S. PATENT DOCUMENTS

| | | | |
|---|---|---|---|
| 4,893,504 A | 1/1990 | O'Meara | |
| 5,444,619 A | 8/1995 | Hoskins et al. | |
| 5,992,519 A | 11/1999 | Ramakrishnan et al. | |
| 6,018,497 A | 1/2000 | Gunasekera | |
| 6,078,869 A | 6/2000 | Gunasekera | |
| 6,106,561 A | 8/2000 | Farmer | |
| 6,230,101 B1 | 5/2001 | Wallis | |
| 6,313,837 B1 | 11/2001 | Assa et al. | |
| 6,490,527 B1 | 12/2002 | Utt | |
| 6,766,255 B2 | 7/2004 | Stone | |
| 6,823,297 B2 | 11/2004 | Jenny et al. | |
| 6,980,940 B1 | 12/2005 | Gurpinar et al. | |
| 7,069,148 B2 | 6/2006 | Thambynayagam et al. | |
| 7,164,990 B2 | 1/2007 | Bratvedt et al. | |
| 7,177,764 B2 | 2/2007 | Stone | |
| 2002/0013687 A1* | 1/2002 | Ortoleva | 703/10 |
| 2003/0132934 A1 | 7/2003 | Fremming | |

(Continued)

FOREIGN PATENT DOCUMENTS

GB  2336008 A  10/1999

(Continued)

OTHER PUBLICATIONS

Yale, D.P., "Coupled geomechanics-fluid flow modeling: effects of plasticity and permeability alteration", Society of Petroleum Engineers, 2002.*

(Continued)

*Primary Examiner* — Kandasamy Thangavelu

(57) ABSTRACT

The invention relates to a computer system for modeling an oilfield having a subterranean formation and an underground reservoir therein. The computer system includes a repository storing a geomechanical model for representing at least a portion of the subterranean formation and the reservoir, the geomechanical model comprising a stress equation and a fluid flow equation, a processor and memory storing instructions when executed by the processor comprising functionalities for combining the stress equation and the fluid flow equation into a matrix equation, and modeling the oilfield by solving the stress equation and the fluid flow equation simultaneously.

19 Claims, 10 Drawing Sheets

U.S. PATENT DOCUMENTS

| | | |
|---|---|---|
| 2003/0216897 A1 | 11/2003 | Endres et al. |
| 2004/0199329 A1* | 10/2004 | Stone .............................. 702/13 |
| 2004/0220846 A1 | 11/2004 | Cullick et al. |
| 2004/0268338 A1 | 12/2004 | Gurpinar et al. |
| 2005/0015231 A1 | 1/2005 | Edwards et al. |
| 2005/0119911 A1 | 6/2005 | Ayan et al. |
| 2005/0149267 A1* | 7/2005 | Van Den Beukel et al. .... 702/14 |
| 2005/0149307 A1 | 7/2005 | Gurpinar et al. |
| 2006/0100837 A1* | 5/2006 | Symington et al. ............. 703/10 |
| 2006/0129366 A1* | 6/2006 | Shaw ............................... 703/10 |
| 2006/0184329 A1 | 8/2006 | Rowan et al. |
| 2006/0197759 A1 | 9/2006 | Fremming |
| 2006/0265204 A1 | 11/2006 | Wallis et al. |
| 2006/0282243 A1 | 12/2006 | Childs et al. |
| 2007/0010979 A1 | 1/2007 | Wallis et al. |
| 2007/0061087 A1 | 3/2007 | Ghorayeb et al. |
| 2007/0112547 A1 | 5/2007 | Ghorayeb et al. |
| 2007/0156377 A1* | 7/2007 | Gurpinar et al. ................ 703/10 |
| 2007/0276639 A1 | 11/2007 | Montaron et al. |
| 2007/0299643 A1 | 12/2007 | Guyaguler et al. |
| 2008/0033656 A1* | 2/2008 | Herwanger ..................... 702/18 |
| 2009/0055098 A1* | 2/2009 | Mese et al. ...................... 702/13 |
| 2009/0216508 A1* | 8/2009 | Dale et al. ....................... 703/10 |
| 2010/0204972 A1* | 8/2010 | Hsu et al. ........................ 703/10 |

FOREIGN PATENT DOCUMENTS

| | | |
|---|---|---|
| WO | 9952048 | 10/1999 |
| WO | 9964896 | 12/1999 |
| WO | 0206857 | 1/2002 |
| WO | 2004049216 A1 | 6/2004 |
| WO | 2005106537 A1 | 11/2005 |
| WO | 2005122001 A1 | 12/2005 |
| WO | 2006058336 A2 | 6/2006 |

OTHER PUBLICATIONS

Jha, B., "A mixed finite element framework for modeling coupled fluid flow and reservoir geomechanics", Stanford University, Jun. 2005.*

Settari, et al., "Advances in coupled geomechanical and reservoir modeling with applications to reservoir compaction" SPE Journal, vol. 6, No. 3, Sep. 2001.

Heeres, et al., "A comparison between the perzyna viscoplastic model and the consistency viscoplastic model", European Journal of Mechanics A/Solids vol. 21, pp. 1-12 (2002).

Liingaard, et al., "Characterization of models for time-dependent behavior of soils", International Journal of Geomechanics, ASCE, Sep. 2004.

* cited by examiner

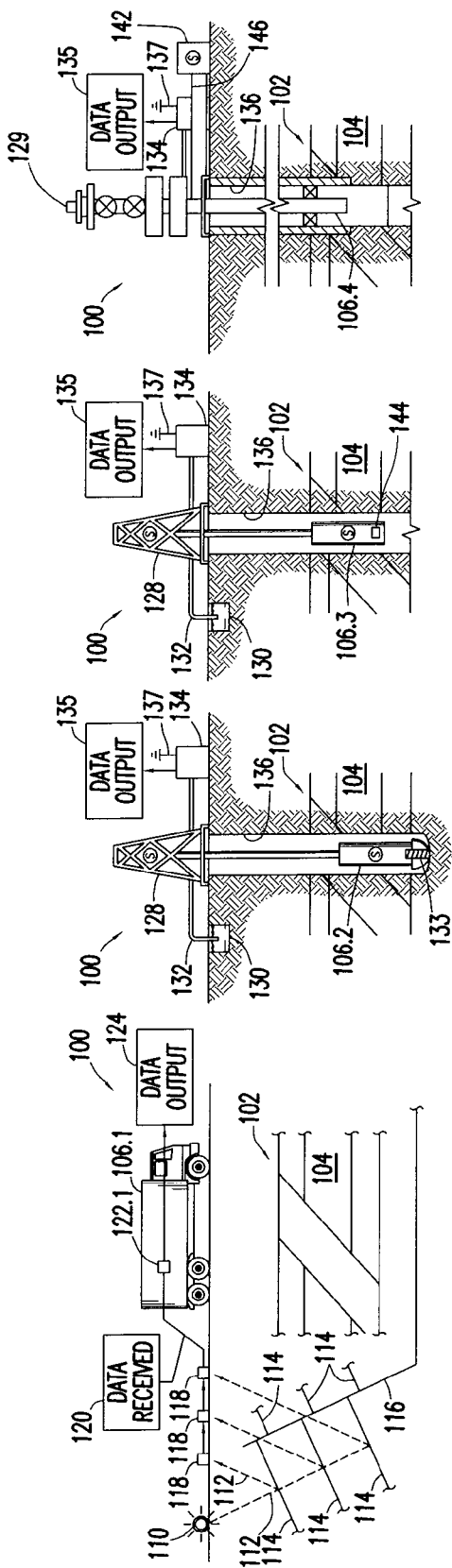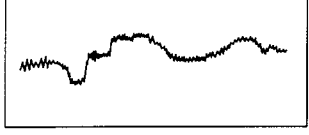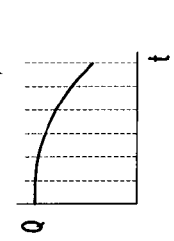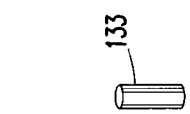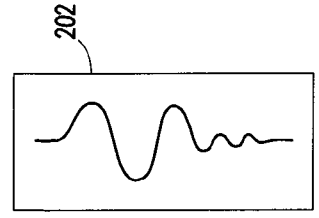

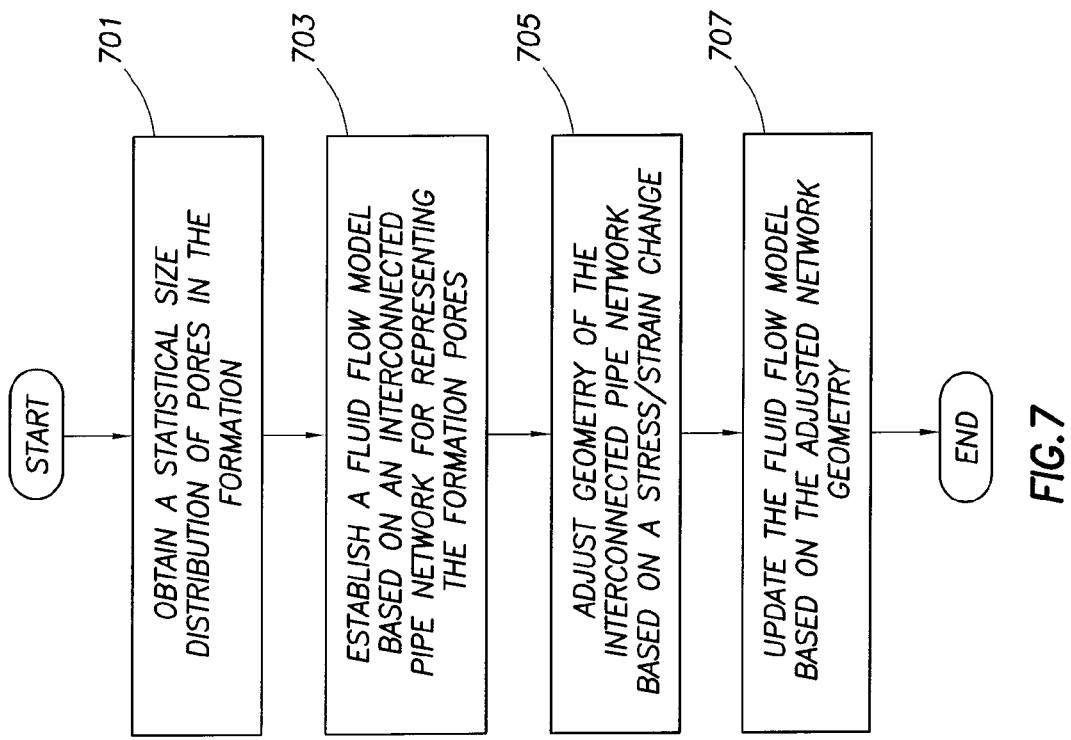
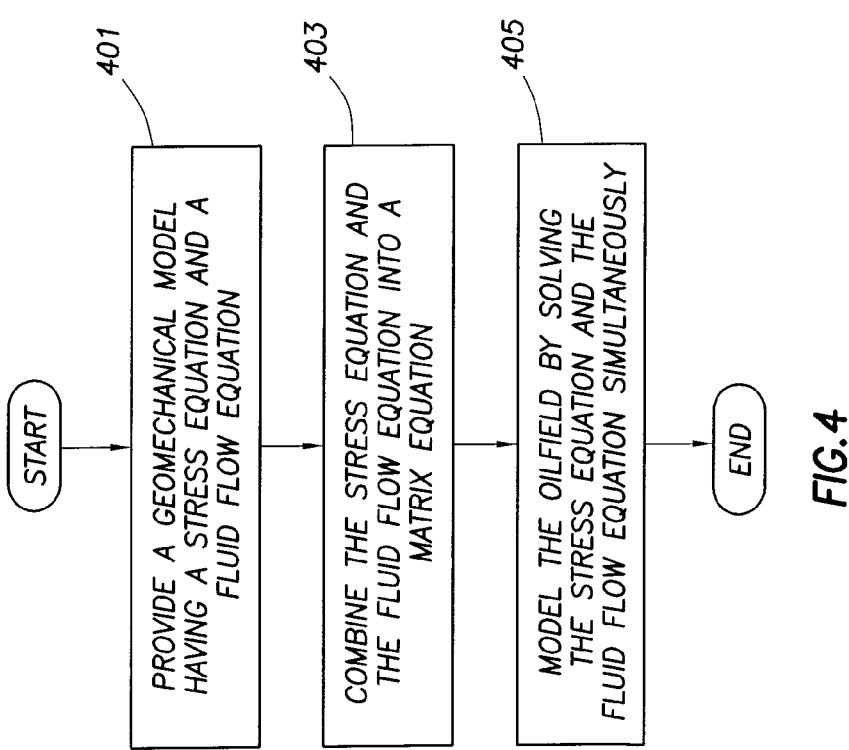

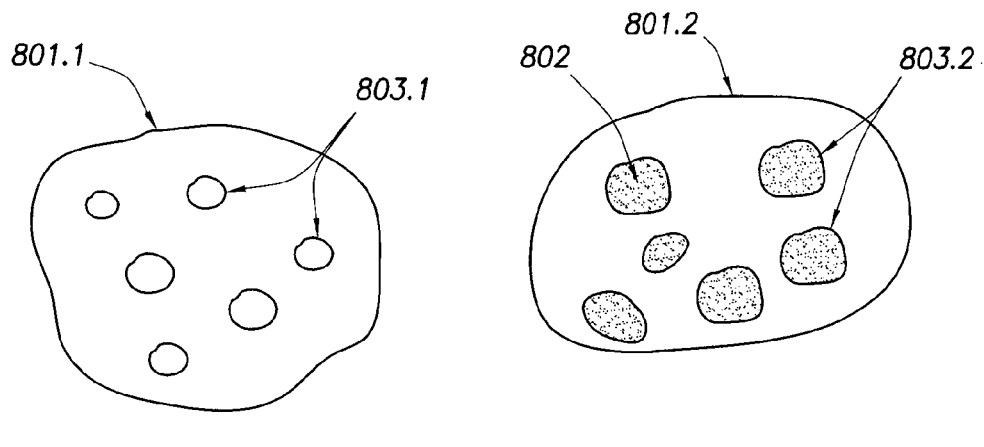
FIG.8.1
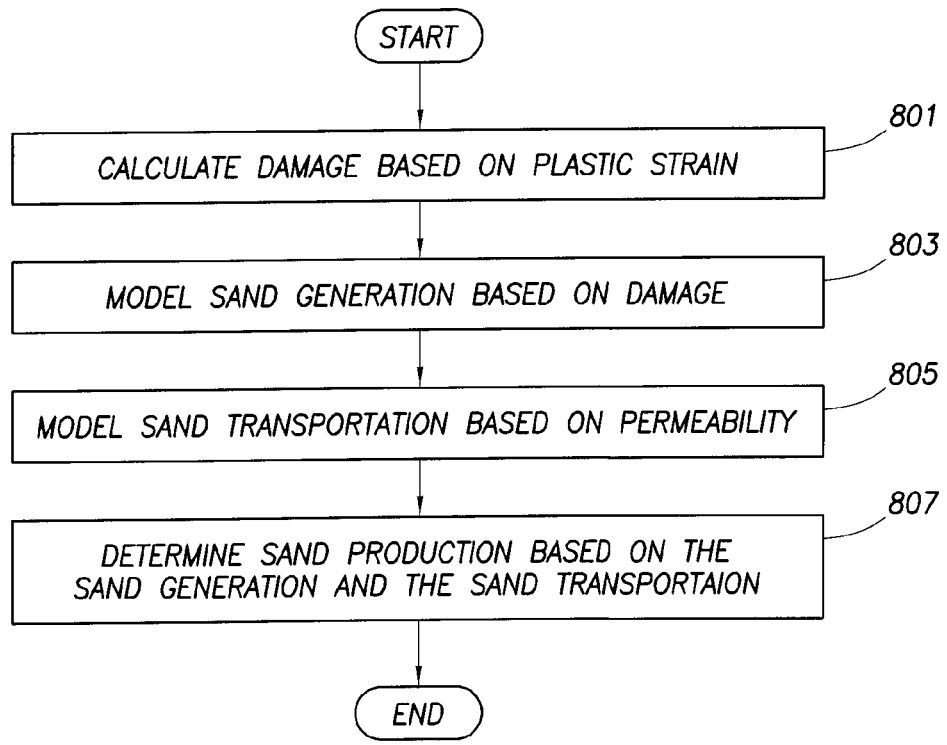
FIG.8.2

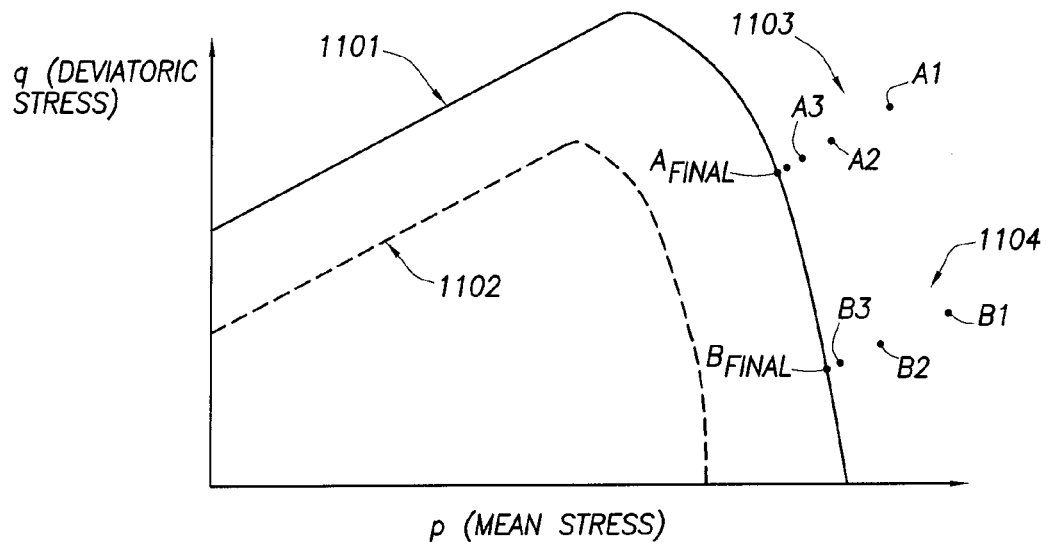
FIG.11.1
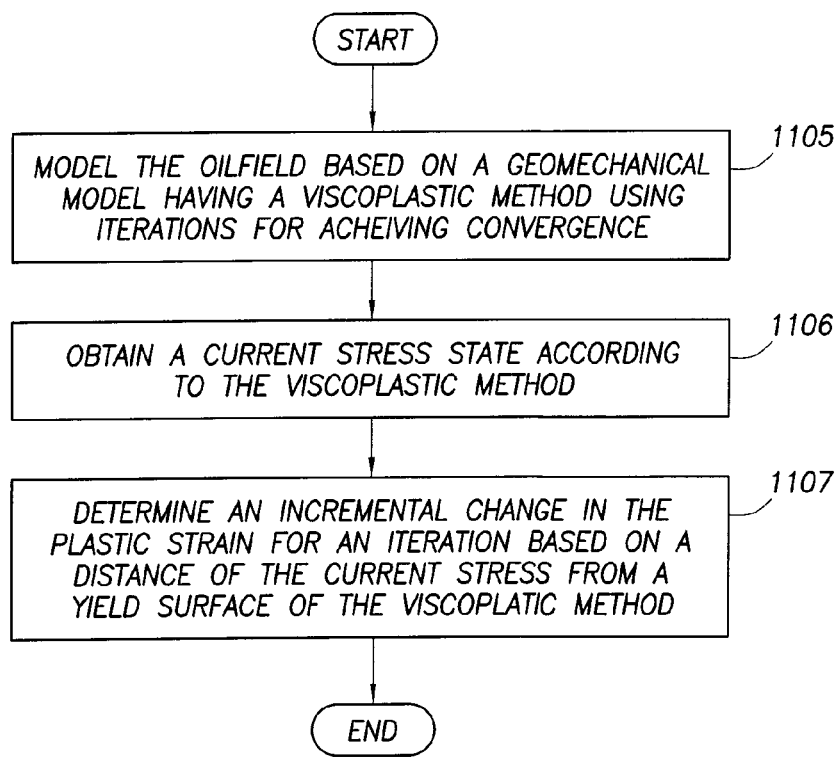
FIG.11.2

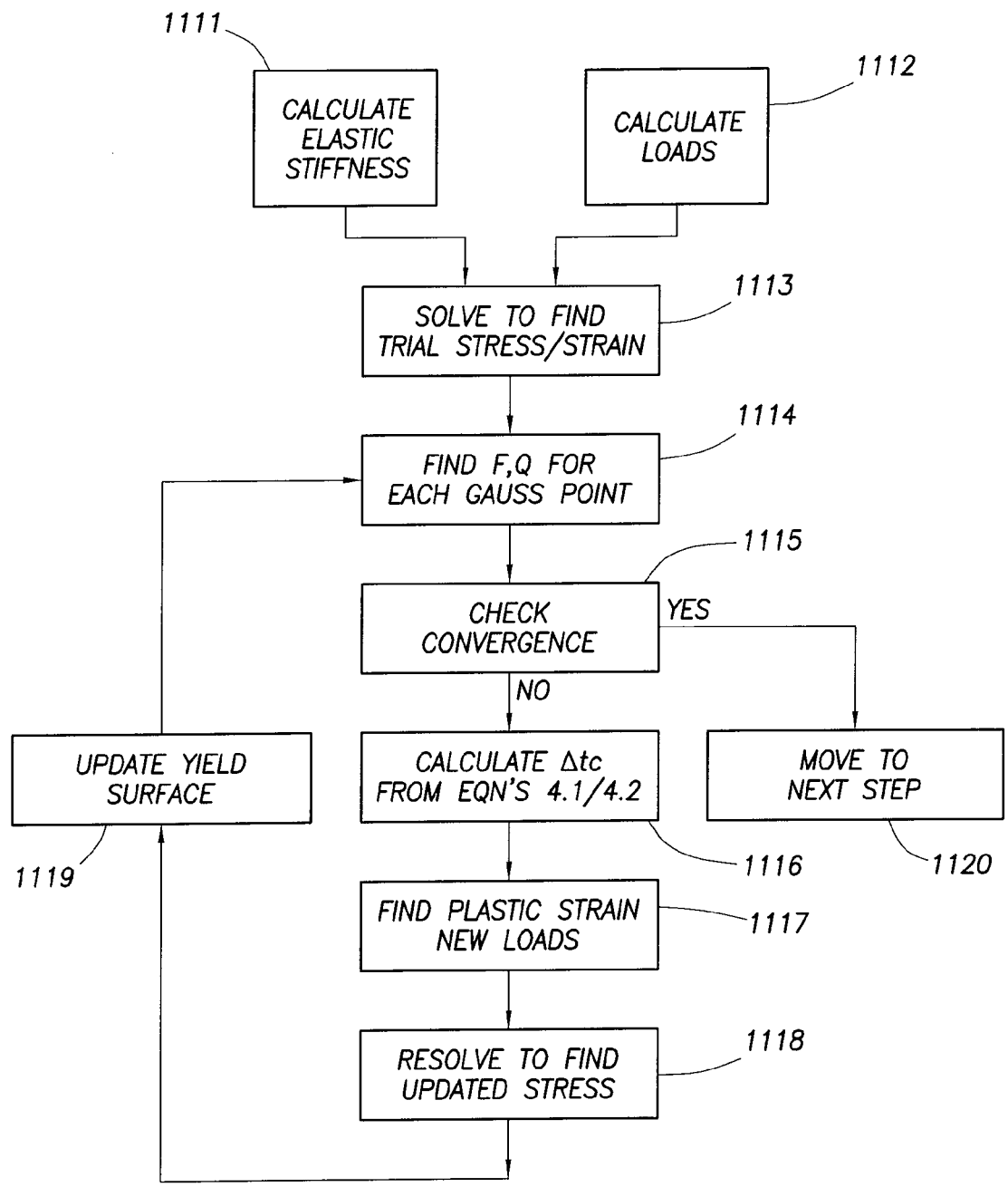
FIG.11.3

FULLY COUPLED SIMULATION FOR FLUID FLOW AND GEOMECHANICAL PROPERTIES IN OILFIELD SIMULATION OPERATIONS

CROSS REFERENCE TO RELATED APPLICATIONS

This Application claims priority under 35 U.S.C. §119(e) to Provisional Patent Application No. 61/102,716, filed Oct. 3, 2008, entitled "SYSTEM AND METHOD FOR PERFORMING OILFIELD SIMULATION OPERATIONS" and Provisional Patent Application No. 61/105,303, filed Oct. 14, 2008, entitled "SYSTEM AND METHOD FOR PERFORMING OILFIELD SIMULATION OPERATIONS," which are both incorporated herein by reference in their entirety.

BACKGROUND

Oilfield operations, such as surveying, drilling, wireline testing, completions, production, planning and oilfield analysis, are typically performed to locate and gather valuable downhole fluids. During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure and geological stratigraphy that define the geological structures of the subterranean formation. Dynamic data relates to, for example, fluids flowing through the geologic structures of the subterranean formation over time. Such static and/or dynamic data may be collected to learn more about the formations and the valuable assets contained therein.

The data may be used to predict downhole conditions, and make decisions concerning oilfield operations. Such decisions may involve well planning, well targeting, well completions, operating levels, production rates and other operations and/or operating parameters. Often this information is used to determine when to drill new wells, re-complete existing wells or alter wellbore production. Oilfield conditions, such as geological, geophysical and reservoir engineering characteristics, may have an impact on oilfield operations, such as risk analysis, economic valuation, and mechanical considerations for the production of subsurface reservoirs.

Data from one or more wellbores may be analyzed to plan or predict various outcomes at a given wellbore. In some cases, the data from neighboring wellbores, or wellbores with similar conditions or equipment may be used to predict how a well will perform. There are usually a large number of variables and large quantities of data to consider in analyzing oilfield operations. It is, therefore, often useful to model the behavior of the oilfield operation to determine the desired course of action. During the ongoing operations, the operating parameters may be adjusted as oilfield conditions change and new information is received.

Techniques have been developed to model the behavior of various aspects of the oilfield operations, such as geological structures, downhole reservoirs, wellbores, surface facilities as well as other portions of the oilfield operation. Typically, there are different types of simulators for different purposes. For example, there are simulators that focus on reservoir properties, wellbore production, or surface processing.

SUMMARY

In general, in one aspect, the invention relates to a computer system for modeling an oilfield having a subterranean formation and an underground reservoir therein. The computer system includes a repository storing a geomechanical model for representing at least a portion of the subterranean formation and the reservoir, the geomechanical model comprising a stress equation and a fluid flow equation, a processor and memory storing instructions when executed by the processor comprising functionalities for combining the stress equation and the fluid flow equation into a matrix equation, and modeling the oilfield by solving the stress equation and the fluid flow equation simultaneously.

Other aspects of the quality measure for data context service will be apparent from the following description and the appended claims.

BRIEF DESCRIPTION OF THE DRAWINGS

So that the above recited features of the fully coupled simulation for fluid flow and geomechanical properties in oilfield simulation operations (hereinafter referred to as "fully coupled oilfield simulation") can be understood in detail, a more particular description, briefly summarized above, may be had by reference to the embodiments thereof that are illustrated in the appended drawings. It is to be noted, however, that the appended drawings illustrate typical embodiments of the fully coupled oilfield simulation and are therefore not to be considered limiting of its scope, for the fully coupled oilfield simulation may admit to other equally effective embodiments.

FIGS. 1.1-1.4 depict a schematic view of an oilfield having subterranean structures containing reservoirs and tools therein, in which embodiments of the fully coupled oilfield simulation can be implemented.

FIGS. 2.1-2.4 depict graphical depictions of data collected by the tools of FIGS. 1.1-1.4, respectively.

FIG. 4 is a flowchart depicting a method of modeling the oilfield in accordance with one or more embodiments.

FIG. 7 is a flowchart depicting a method of modeling permeability of the subterranean formation in the oilfield in accordance with one or more embodiments.

FIG. 8.1 shows an example schematic diagram of loose sand being created in rock pores of the subterranean formation in accordance with one or more embodiments.

FIG. 8.2 is a flowchart depicting a method of modeling sand production in the oilfield in accordance with one or more embodiments.

FIG. 11.1 shows an example yield surface diagram of viscoplastic method for modeling the oilfield in accordance with one or more embodiments.

FIGS. 11.2 and 11.3 are flowcharts depicting a method of determining pseudo-time-steps for viscoplastic method in modeling the oilfield in accordance with one or more embodiments.

DETAILED DESCRIPTION

Figure 3:
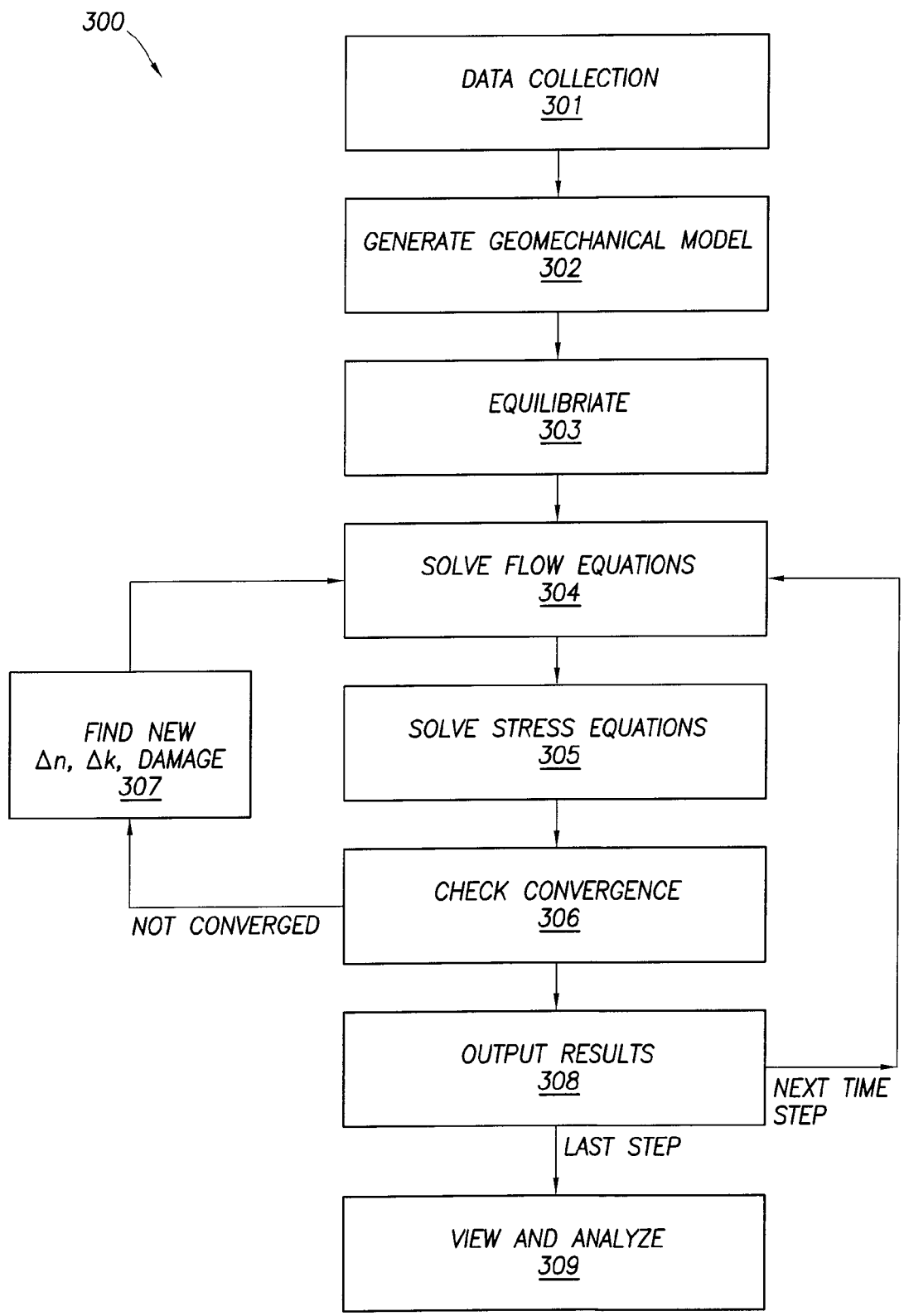
FIG. 3 shows an example schematic diagram of a workflow of the oilfield in accordance with one or more embodiments.

Embodiments of the fully coupled oilfield simulation are shown in the above-identified figures and described in detail below. In describing the embodiments, like or identical reference numerals are used to identify common or similar elements. The figures are not necessarily to scale and certain features and certain views of the figures may be shown exaggerated in scale or in schematic in the interest of clarity and conciseness.

In general, embodiments of the fully coupled oilfield simulation provide capabilities of (i) performing fully coupled simulations considering the fluid flow part of the reservoir simulation along with geomechanical properties in the surrounding formations so that accurate results can be obtained without requiring an iterative convergence procedure, (ii) considering realistic physical relationship between changes in geomechanical parameters (such as stress and strain) and changes in parameters governing fluid flow (such as porosity and permeability), (iii) applying statistical data at a microscopic level from laboratory testing for constraining a fluid flow model rather than just applying an average value associated with a macroscopic region, (iv) predicting (particularly with heavy oil) sand production, permeability changes, compaction, subsidence, and rate and total amount of oil production within a consistent geomechanical framework, (v) speeding up the return of iteratively calculated stress to the yield surface in viscoplastic method, (vi) saving computing resources by using neural network methods in applicable workflows, and (vii) incorporating field monitoring data in the simulations and delivering results rapidly in a format relevant for field operations.

FIGS. 1.1-1.4 show a schematic view of an oilfield having subterranean structures containing reservoirs therein, with various oilfield operations being performed on the oilfield.

FIG. 1.1 depicts a survey operation being performed to generate a seismic data output record (124) using recording truck computer (122.1) on a seismic recording truck (106.1) to receive, via geophone-receivers (118), data (120) of sound vibration(s) (112) that reflect off horizons (114) in an earth formation (116) from an acoustic source (110).

FIG. 1.2 depicts a drilling operation being performed by a drilling tool (106.2) suspended by a rig (128) and advanced into the subterranean formation (102) to form a wellbore (136) for reaching the reservoir (104). Drilling mud is circulated through the drilling tool (106.2) via a flow line (132) back to a mud pit (130) on the surface. The drilling tool may be adapted for measuring downhole properties such as adapted for taking a core sample (133). A surface unit (134) with a transceiver (137) collects data output (135) generated during the drilling operation and allows communications between various portions of the oilfield (100) or other locations.

FIG. 1.3 depicts a wireline operation and includes all the elements depicted in FIG. 1.2 except that the drilling tool (106.2) is substituted with a wireline tool (106.3) adapted for performing well logs, downhole tests, collecting samples, and/or performing a seismic survey operation based on an explosive or acoustic energy source (144) in which case the wireline tool (106.3) may provide data output (135) to the surface unit (134).

FIG. 1.4 depicts a production operation being performed by a production tool (106.4) deployed from a production unit or christmas tree (129) and into the completed wellbore (136) of FIG. 1.3 in the subterranean formation (102) for drawing fluid from the reservoir (104) into surface facilities (142) via a gathering network (146). Sensors (S) positioned about the oilfield (100) are operatively connected to a surface unit (134) with a transceiver (137) for collecting data (135), for example, reservoir data, wellbore data, surface data and/or process data.

While one wellsite is shown, it will be appreciated that the oilfield (100) may cover a portion of land that hosts one or more wellsites. Part, or all, of the oilfield may be on land and/or sea. Also, the oilfield operations depicted in FIGS. 1.1-1.4 may be performed with any combination of one or more oilfields, one or more processing facilities and one or more wellsites.

FIGS. 2.1-2.4 are graphical depictions of data collected by the tools of FIGS. 1.1-1.4, respectively. FIG. 2.1 depicts a seismic trace (202) of the subterranean formation (102) of FIG. 1.1 taken by seismic recording truck (106.1). FIG. 2.2 depicts a core sample (133) taken by the drilling tool (106.2) of FIG. 1.2. FIG. 2.3 depicts a well log (204) of the subterranean formation (102) taken by the wireline tool (106.3) of FIG. 1.3. FIG. 2.4 depicts a production decline curve (206) of fluid flowing through the subterranean formation (102) taken by the production tool (106.4) of FIG. 1.4.

FIG. 3 shows an example schematic diagram of a workflow (300) depicting the oilfield simulation in detail. In one or more embodiments, finite element methods are used for solving a variety of complex engineering problems encountered in the oilfield. These complex engineering problems may be modeled using partial differential equations and/or integral equations based on the physical phenomenon involved. In one or more embodiments, these partial differential equations and/or integral equations are approximated and/or supplemented with alternative equations or simplifications, which are numerically stable and can be solved more efficiently.

The workflow (300) includes Element 301 through Element 309 for analyzing the reservoir and surrounding formations. There is a strong interdependence between the equations that describe fluid flow in a reservoir and the equations that govern stress and strain in the surrounding formations. Pore pressure gradients may drive the fluid flow and at the same time alter the effective stress that controls rock deformation in the surrounding formations. Similarly, porosity and permeability changes resulting from strain in the rock may control how much fluid the rock can contain and how easily it can flow.

A shown in FIG. 3, Element 301 collects data for initial oilfield properties, for example, from reservoir simulators, sensors, empirical values, test data, or other data as described in FIGS. 2.1-2.4 above. Element 302 initializes a geomechanical earth model (e.g., a 3D geomechanical earth model) with the initial oilfield properties. The geomechanical earth model may include a stress equation and a fluid flow equation for describing the reservoir and surrounding subterranean formation of the oilfield. Geological and geomechanical data may be incorporated using automated procedures to assign values to an array of simulation grid blocks (i.e., a finite element mesh) of the geomechanical earth model. Element 303 generates an equilibrated geomechanical model using a geomechanics simulator. The geological and geomechanical properties (e.g., the stress, pore pressure, etc.) of the equilibrated geomechanical model are consistent with initial observations and measurements of the reservoir and the surrounding formation at the beginning of a simulation time period, which represents an interval in the lifetime of the reservoir (e.g. January 2008-April 2008, July 2007-July 2008, etc.).

Further as shown in FIG. 3, Element 304 through Element 308 may be performed for each of many simulation time steps (e.g., hourly, daily, weekly, monthly, annually, or any other suitable time increments) of the simulation time period. Element 304 may be performed by a reservoir simulator to generate incremental changes of fluid flow parameters (e.g., change in pressure $\Delta p$, change in temperature $\Delta T$, change in saturation $\Delta S_w$, etc.) at each time step by solving the fluid flow equation. Element 305 may be performed by a geomechanical simulator to generate incremental changes of geomechanical parameters (e.g., change in stress $\Delta \sigma$, change in strain $\Delta \epsilon$, etc.) at each time step by solving the stress equation. Incremental changes of fluid flow parameters from Element 304 may be used as inputs to Element 305. Element 307 uses changes in strain $\Delta \epsilon$ to compute changes in permeability ($\Delta K$) and porosity ($\Delta n$), which provide new inputs for the reservoir simulator of Element 304. Damage and sand production may also be calculated in Element 307 where appropriate. More details of damage and sand production are described in FIGS. 8.1 and 8.2 below.

Continuing with FIG. 3, for each time step, Element 304 through Element 307 may be performed iteratively until convergence is reached in Element 306. Furthermore, Element 304 through Element 308 may be performed using coupled simulation. For example, the reservoir simulator of Element 304 and the geomechanical simulator of Element 305 may be separate simulators configured for performing coupled simulation. Coupled simulations ensure that information relating to key parameters (e.g., pressure, temperature, saturation, stress, strain, permeability, porosity, etc.) is transmitted between separate equations (e.g., fluid flow equation, stress equation, etc.) so that the behavior modeled by these equations is consistent. In the coupled simulations, iterations are performed between the stress and flow simulators. For example, there are three types of coupled simulations as described below where the first two types are referred to as partially coupled simulation or partial coupling.

(1) Explicitly coupled simulation (one iteration only between separate stress and flow simulators).

(2) Iteratively coupled (multiple iterations between separate stress and flow simulators).

(3) Fully coupled simulation (multiple iterations with both stress and flow simulators combined in one fully coupled simulator enabling simultaneous solution of displacements pressure and saturations).

In the example depicted in FIG. 3, partial coupling is performed by solving the fluid flow equation and the stress equation in alternating steps (e.g., Element 304 and Element 305) and by iterating (e.g., through Element 307) the alternate steps until both pore pressures and porosities are sufficiently consistent (e.g. converged in Element 306) between the two equation sets. In other examples, full coupling may be performed as described in more detail later.

Continuing with the workflow, Element 308 exports results in suitable format for interface with other simulation tools and for providing alerts to user of the workflow. Element 304 through Element 308 may be performed until a predetermined criteria (e.g. reservoir scheduling) is met. Element 309 generates a full field view (e.g., a 3D view) of all properties and parameters at any time during the simulation time window for analysis by the user of the workflow. Element 309 is configured to provide review and analysis.

FIG. 4 is a flowchart depicting a method of modeling the oilfield using fully coupled simulation. Initially, portions of the oilfield being modeled (e.g., a reservoir and/or surrounding formations) may be represented as a geomechanical model having an array of grid blocks (or finite elements) (Element 401). The behavior of fluid flow in the reservoir and the stress and strain in the surrounding formations may be formulated as separate equations using displacements, pore pressures and saturations as freedoms for each of the grid blocks. Example equations for describing these behaviors are given as equations 1.1 and 1.2 below. The flow equations in the general form of equation 1.2 are non-hyperbolic and therefore difficult to solve requiring smoothing techniques (e.g., including streamlining and/or shock capturing terms) to ensure stable fluid flow in the solution. In (Element 403), the stress equation and the fluid flow equation are combined into a matrix equation, which may be solved simultaneously to perform the workflow (Element 304 through Element 306) in fully coupled simulation (Element 405). More details of example Element 403 and example Element 405 are also described below.

Equation 1.1 below relates gradients of the stress tensor $\sigma_{ij}$ in the rock to the loads (f) acting at each grid block in the array. The load vector (f) may include the effects of pore pressure. The subscripts i and j are used for referencing different coordinate directions (e.g., x, y, z).

$$\frac{\partial \sigma_{ij}}{\partial x_j} = f_i \qquad (1.1)$$

The stress may be related to strain through constitutive laws that may vary between simulations covering different areas of the reservoir and/or the surrounding formations.

Equation 1.2 below is a general form of the governing continuity equations of fluid flow for a phase denoted by the subscript i=p, w, o, g.

$$A_i \frac{\partial s_w}{\partial t} + B_i \frac{\partial s_g}{\partial t} + C_i \frac{\partial p_w}{\partial t} + D_i \frac{\partial \varepsilon_v}{\partial t} + \nabla \cdot v_i = Q_i \qquad (1.2)$$

Here t represents time, $S_w$, and $S_g$ are the saturations of water and gas, $p_w$ is the pressure of the water phase, $\epsilon_v$, is the volumetric strain, $v_i$ is the phase velocity, and $Q_i$ is the flow rate. The parameters $A_i$ $B_i$ $C_i$ and $D_i$ are functions of fluid compressibility, volume formation factor, gas-oil ratio, Biot's coefficient, capillary pressure, porosity, pressure and saturation, respectively. For each phase of the fluid, an equation of this general form may be formulated to describe the flow. The phase may be water (where i=w), oil with or without dissolved gas (where i=o), or gas (where i=g). Additionally, a pressure equation (where i=p) may be formed from the sum of the three phase equations of the water phase, oil phase with or without dissolved gas, and gas phase.

As described above, the continuity equations may be summed to form a pressure equation (where i=p). Two companion continuity equations for oil and gas may be added to form the set of equations below:

$$A_p \frac{\partial S_w}{\partial t} + B_p \frac{\partial S_g}{\partial t} + C_p \frac{\partial p_w}{\partial t} + D_p \frac{\partial \varepsilon_v}{\partial t} + \nabla \cdot v_t = Q_t \qquad (1.3)$$

$$A_o \frac{\partial S_w}{\partial t} + B_o \frac{\partial S_g}{\partial t} + C_o \frac{\partial p_w}{\partial t} + D_o \frac{\partial \varepsilon_v}{\partial t} + \nabla \cdot v_o = Q_o$$

$$A_g \frac{\partial S_w}{\partial t} + B_g \frac{\partial S_g}{\partial t} + C_g \frac{\partial p_w}{\partial t} + D_g \frac{\partial \varepsilon_v}{\partial t} + \nabla \cdot v_g = Q_g$$

where $$A_p = A_w + A_o + A_g$$

$$B_p = B_w + B_o + B_g$$

$$C_p = C_w + C_o + C_g$$

$$D_p = D_w + D_o + D_g \quad (1.4)$$

with $Q_t$ denoting a total flow $$Q_t = Q_w + Q_o + Q_g \quad (1.5)$$

and where $$S_w + S_o + S_g = 1 \quad (1.6)$$

The coefficients $A_i$, $B_i$, $C_i$ and $D_i$ (for i=w, o, and g) are given vectorially by $$\begin{pmatrix} A_w \\ A_o \\ A_g \end{pmatrix} = \begin{pmatrix} \frac{n}{B_w} \\ -\frac{n}{B_o} + \frac{nc_o S_o}{B_o} p'_{cw} \\ \left(\frac{nc_g S_g}{B_g} + \frac{nS_o}{B_n}[c_o R_s + R'_s]\right) p'_{cw} - \frac{nR_s}{B_o} \end{pmatrix} \quad (1.7)$$

$$\begin{pmatrix} B_w \\ B_o \\ B_g \end{pmatrix} = \begin{pmatrix} 0 \\ -\frac{n}{B_o} \\ \frac{n}{B_g} + \frac{nc_g S_g}{B_g} p'_{cg} - \frac{nR_s}{B_o} \end{pmatrix}$$

$$\begin{pmatrix} C_w \\ C_o \\ C_g \end{pmatrix} = \begin{pmatrix} c_s \frac{S_w}{B_w}(\alpha - n) + \frac{nc_w S_w}{B_w} \\ c_s \frac{S_o(\alpha - n)}{B_o} + \frac{nc_o S_o}{B_o} \\ \left(\frac{S_g}{B_g} + \frac{S_o}{B_o} R_s\right) c_s (\alpha - n) + \frac{nc_g S_g}{B_g} + \frac{nc_o S_o R_s}{B_o} + \frac{nS_o R'_s}{B_o} \end{pmatrix}$$

$$\begin{pmatrix} D_w \\ D_o \\ D_g \end{pmatrix} = \begin{pmatrix} \alpha \frac{S_w}{B_w} \\ \alpha \frac{S_o}{B_o} \\ \alpha \left(\frac{S_g}{B_g} + \frac{S_o}{B_o} R_s\right) \end{pmatrix}$$

Here volume formation factors are defined as:

$$B_w = B_w(p_w)$$

$$B_o = B_o(p_o)$$

$$B_g = B_g(p_g) \quad (1.8)$$

where p denotes phase pressure with $$p_o = p_w + p_{cw}$$

$$p_g = p_o + p_{cg} \quad (1.9)$$

with $p_{cw}$ denoting the capillary pressure in an oil/water system and $p_{cg}$ denoting the capillary pressure in a gas/oil system. "Filtration" velocities $v_t$, $v_o$, $v_g$ associated with total flow, oil and gas flows are defined below.

$$v_t = -M_w(\nabla p_w - \rho_w b)v_o - M_o(\nabla p_o - \rho_o b)v_g - M_g(\nabla p_g - \rho_g b) \quad (1.10)$$

$$\begin{pmatrix} v_o \\ v_g \end{pmatrix} = \begin{pmatrix} f_n & -p'_{cw}\frac{\lambda_o(\lambda_w + \lambda_o R_s)}{\lambda_t} & p'_{cg}\frac{\lambda_o \lambda_g}{\lambda_t} \\ f_g & p'_{cw}\frac{(\lambda_o^2 R_s - \lambda_w \lambda_g)}{\lambda_t} & -p'_{cg}\frac{\lambda_g(\lambda_w + \lambda_o)}{\lambda_t} \end{pmatrix} \begin{pmatrix} v_t \\ \nabla S_w \\ \nabla S_g \end{pmatrix}$$

where $\rho_w$, $\rho_o$, $\rho_g$ are water, oil and gas densities, respectively. Body forces are denoted by the vector b and capillary pressure gradients by $p'_{cw}$ and $p'_{cg}$. The system mobility tensors $M_w$, $M_o$, $M_g$ are given by $$M_w = \lambda_w K_w \quad \lambda_w = \frac{k_w}{B_w \mu_w} \quad (1.11)$$

$$M_o = \lambda_o K_o \quad \lambda_o = \frac{k_{ro}}{B_o \mu_o}$$

$$M_g = \lambda_g K_g \quad \lambda_g = \frac{k_{ro}}{B_o \mu_o}$$

Here $K_w$, $K_o$, $K_g$ are permeability tensors with $\lambda_w$, $\lambda_o$, $\lambda_g$ denoting permeability multipliers. $B_w$, $B_o$, $B_g$ denote volume factors with $\mu_w$, $\mu_o$, $\mu_g$ denoting viscosities. Relative permeabilities for water, oil and gas are given respectively by $k_{rw}$, $k_{ro}$, $k_{rg}$.

One example method of converting the non-hyperbolic form of equation 1.2 to a hyperbolic form may be performed using a substitution equation $$v_i = f_i v_t + g_i \nabla s_w + h_i \nabla s_g,$$

where each of $f_i$, $g_i$ and $h_i$ represents a parametric function of fluid compressibility, volume formation factor, gas-oil ratio, Biot's coefficient, capillary pressure, porosity, pressure and saturation, and $v_t$ represents "filtration" velocity associated with total flow. The substitution results in an equation in the hyperbolic form, as follows:

$$A_i^* \frac{\partial S_w}{\partial t} + B_i^* \frac{\partial S_g}{\partial t} + C_i^* \frac{\partial p_w}{\partial t} + D_i^* \frac{\partial \varepsilon_v}{\partial t} + E_i^* v_i \cdot \nabla S_w + F_i^* v_t \cdot \nabla S_g = Q_i^*.$$

Here Ai*, Bi*, Ci*, Di*, Ei* and Fi* each represents a parametric function of fluid compressibility, volume formation factor, gas-oil ratio, Biot's coefficient, capillary pressure, porosity, pressure and saturation. This converted equation is then expressed in integral form, and discretized following a Petrov-Galerkin and shock capturing finite element method. More details of the example method above are given below. The equations are given as an example. In other examples, the exact equations may vary and depend on the particular model in use.

The non-hyperbolic equation may now be converted into weak form with Petrov Galerkin methods (as it is known in the art) applied to smooth out the solutions for the saturations. Specifically, streamline-upwind Petrov Galerkin methods, shock capturing techniques and Galerkin least-squares approaches are invoked. The resultant set of equations take the matrix form below.

$$\begin{pmatrix} K_{11} & K_{12} & K_{13} & K_{14} & K_{15} & K_{16} \\ K_{21} & K_{22} & K_{23} & K_{24} & K_{25} & K_{26} \\ K_{31} & K_{32} & K_{33} & K_{34} & K_{35} & K_{36} \\ K_{41} & K_{42} & K_{43} & K_{44} & K_{45} & K_{46} \\ K_{51} & K_{52} & K_{53} & K_{54} & K_{55} & K_{56} \\ K_{61} & K_{62} & K_{63} & K_{64} & K_{65} & K_{66} \end{pmatrix} \begin{pmatrix} u_x \\ u_y \\ u_z \\ p \\ s_w \\ s_g \end{pmatrix} = \begin{pmatrix} f_x \\ f_y \\ f_z \\ g_t \\ q_n \\ q_g \end{pmatrix} \quad (1.12)$$

Here $K_{ij}$ (i, j=1, 6) are "stiffness" matrices. These coupled equations in the matrix form may then be solved simultaneously, ensuring pressures are consistent in both stress and flow equations.

Permeability is a key parameter that governs how much flow occurs through a fluid-filled rock when there is a pressure gradient within the fluid. Different rocks may have a wide variation in permeability, which often varies with direction within a given rock layer. Furthermore, the permeability of the same rock sample may also vary considerably as stress, temperature and pore pressure change, and particularly as elastic and plastic strain accumulate in the rock sample. Accordingly, it is desirable to model permeability with these dependencies.

Figure 5:
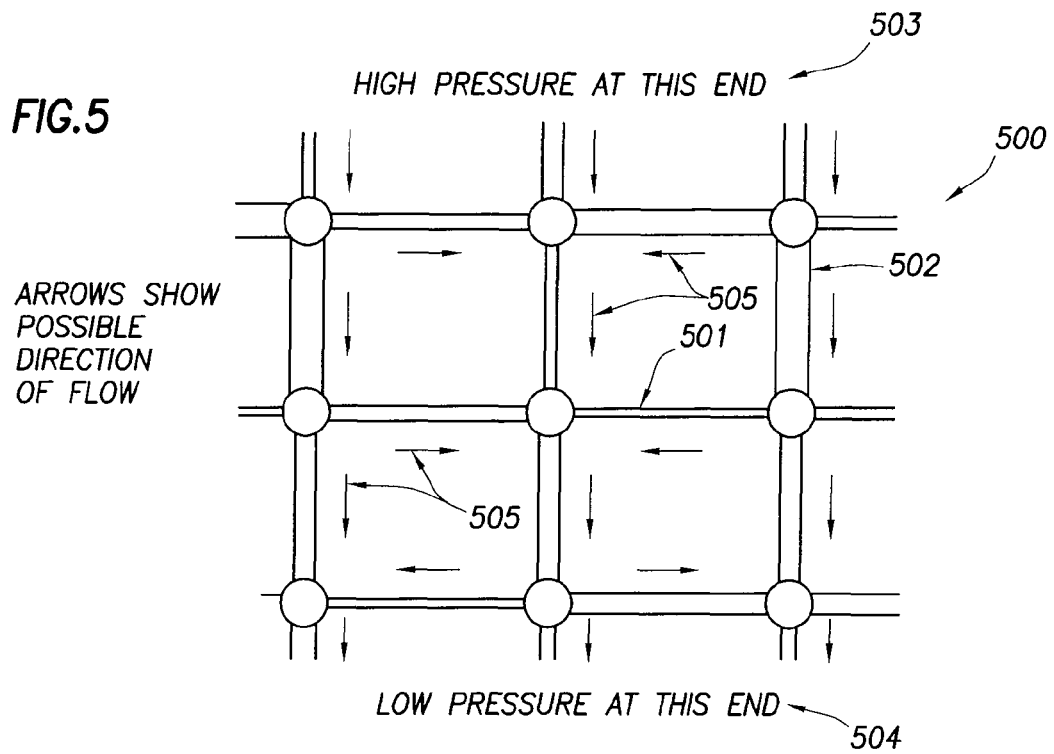
FIG. 5 shows an example schematic diagram of an interconnected pipe network for modeling permeability of the subterranean formation in accordance with one or more embodiments.

FIG. 5 shows an example schematic diagram of an interconnected pipe network (500) for modeling permeability of the subterranean formation. In this model, the pore spaces at a microscopic level are represented as a network of pipes. For example, an imaginary cube in the formation may be modeled by the interconnected pipe network (500). One end (503) of the network may have higher pressure than that of the other end (504). The resultant pressure gradients in the network (500) may cause fluid to flow along directions represented by the arrows (505). The pipes (e.g., (501) and (502)) have a range of diameters that are chosen to reflect the statistical distribution of pore sizes and their connectivity in the rock formation. For example, the pipe (501) is shown to have a smaller diameter than that of the pipe (502). Although not specifically shown in FIG. 5, pipes (501) and (502) may have different lengths. Such distribution may be measured by test methods, for example mercury porosimetry tests.

Figure 6:
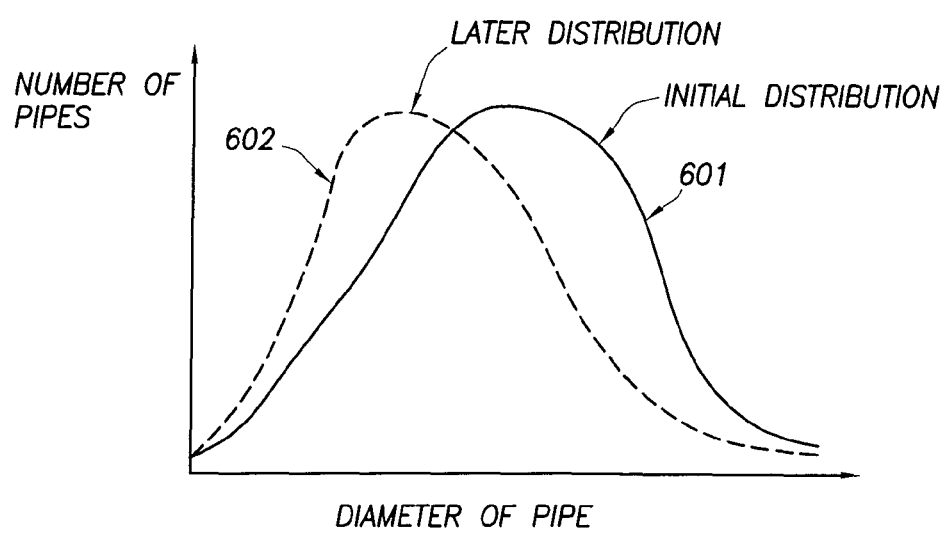
FIG. 6 shows an example distribution diagram of rock pores of the subterranean formation modeled using the interconnected pipe network of FIG. 5.

FIG. 6 shows an example distribution diagram of rock pores of the subterranean formation modeled using the interconnected pipe network (500). The horizontal axis of the diagram represents diameter of the pipes in the interconnected network (500). The vertical axis of the diagram represents the number of pipes having a specific diameter. Once an initial distribution (e.g. (601)) is chosen based on a test method (e.g., the aforementioned mercury porosimetry test), a corresponding permeability tensor may be constructed to model the permeability influenced by various initial properties of the formation rock. Subsequent changes in stresses, strains, temperatures and pressures in the formation may be calculated based on a geomechanical simulation workflow, such as the workflow (300) described with respect to FIG. 3 above. These changes may cause associated changes in microscopic geometries of the rock pores resulting in a revised distribution of pipe diameters (e.g., (602)).

FIG. 7 is a flowchart depicting a method of modeling permeability of the subterranean formation in the oilfield. Initially, a statistical size distribution (e.g., (601)) of pores in the subterranean formation is obtained (Element 701). A fluid flow model may then be established based on an interconnected pipe network (e.g., (500)) representing the pores in the formation (Element 703). The geometries (e.g., pipe diameter, pipe length, etc.) of the interconnected pipe network may be determined based on the initial statistical size distribution (601). For example, the pipe diameter may be chosen to reflect the pore sizes and the pipe length may be chosen to represent the porosity as a result of the pore density and pore connectivity. The fluid flow model may be used in calculating fluid flow for a given pressure gradient applied through the network (500) representing a cube in the formation. The effective permeability may be calculated accordingly and used as inputs to other calculations in a workflow (e.g., workflow (300)). As stress and strain are calculated from the workflow, associated changes in pores at a microscopic level and resultant changes in porosity may be modeled by revising the geometries of Element 705 of the interconnected pipe network (500). Accordingly, the fluid flow model may be updated based on the revised pipe network model. More details of the fluid flow model based on the interconnected network (500) are described in equations 2.1 through 2.4 below as an example. In other examples, the exact equations may vary and depend on the particular model in use.

Equation 2.1 determines the capillary pressure $P_c$ that is required for fluid to enter a pipe (e.g., (701) or (502)).

$$P_c = \frac{2s\cos\theta}{r} \quad (2.1)$$

where s is the surface tension, $\theta$ is the contact angle, and r is the pipe radius.

Equation 2.2 determines the flow rate Q along a pipe of length l and radius r, with head loss $\Delta H$.

$$\Delta H = \frac{8\mu l Q}{\rho g \pi r^4} \quad (2.2)$$

where $\mu$ is the fluid viscosity, $\rho$ is the fluid density, and g is the acceleration due to gravity.

Equation 2.3 relates the permeability k of the network to the overall volumetric flow rate Q.

$$Q = Aki \quad (2.3)$$

where A is the cross-sectional area of a cube represented by the network in the formation and i is the hydraulic gradient across the network.

Equation 2.4 converts the permeability k from equation (2.3) into absolute permeability K $$K = \frac{k\mu}{\gamma} \quad (2.4)$$

where $\mu$ is the fluid viscosity and $\gamma$ is the unit weight of the fluid.

There are a number of situations in which the creation of loose sand and its production with oil are relevant factors at oil wellsites. One example case is heavy oil reservoirs, where sand production can be beneficial if it is associated with increased permeability resulting in an increase in the oil flow to the well. It is therefore desirable to be able to model both the sand production and associated effects on the permeability and other geomechanical properties of the rock formation. Sand production is also a factor in some reservoirs with conventional (non-heavy) oil production, where it is generally an undesirable effect that well placements and schedules should be designed to avoid.

FIG. 8.1 shows an example schematic diagram of loose sand being created in rock pores of the oilfield. The sand creation and production may be modeled at the end of solving the stress equations in Element (305) of the workflow (300) in FIG. 3 by modifying the geomechanical properties and permeability for the next iteration through Element (307) of the workflow (300). The model uses the concept of damage as depicted in FIG. 8.1. The damage is related to a change in porosity of intact rock caused by disassociation of sand grains from the rock matrix, which may be described as equation 3.1 below. For example, the rock (801.1) may represent an initial texture having pores (803.1) that may contain oil. As oil is extracted from the pores (803.1), the rock (801.2) may represent a final texture having enlarged pores (803.2) that may contain dissociated sand grains (802) and residual oil. That disassociation may be modeled based on plastic strain (e.g., equation 3.2) and a modified Drucker-Prager constitutive law (e.g., equations 3.4 and 3.5). In this model, the damage and constitutive law parameters control how much sand is produced for a given strain, while a related law (e.g. dependency on volumetric strain) may govern how much the permeability changes as a result of the damage.

FIG. 8.2 is a flowchart depicting a method of modeling sand production in the oilfield. Initially, damage is calculated based on plastic strain (Element 801). The plastic strain may be calculated using the workflow (300) in FIG. 3 by solving the fluid flow and stress equations in conjunction with, for example viscoplastic method. Once the plastic strain is obtained, the damage may be calculated based on change in porosity induced by the plastic strain. Under a given strain, the change in porosity may be caused by dissociation of sand grains from the rock matrix, which is governed by constitutive laws such as a modified Drucker-Prager constitutive law. Appropriate parameters may be chosen for the constitutive laws depending on the rock properties. The sand generation may then be modeled based on the damage and the constitutive law (Element 803). A dependence relationship of permeability on strain may be assigned. The permeability may be then calculated based on the plastic strain and damage (Element 805). Additionally, the sand transportation may be modeled based on the permeability, which is a manifestation of porosity depicted in the model of FIG. 8.1 above. With the sand generation and transportation being modeled, the sand production at the well may be determined accordingly (Element 807).

More details of the sand production based on the sand creation model as depicted in FIG. 8.1 are described in equations 3.1 through 3.5 below as an example. In other examples, the exact equations may vary and depend on the particular model in use.

Equation 3.1 relates damage, d, to the difference between current porosity $\phi$ and initial porosity $\phi_0$.

$$d = \phi - \phi_0 \quad (3.1)$$

Equation 3.2 expresses the damage as a function of equivalent plastic strain $\epsilon^{eqp}$ and dilitant plastic volumetric strain $\epsilon_{vp}^+$ $$d = \epsilon_{vp}^+ + \psi \epsilon^{eqp} \quad (3.2)$$

where the damage parameter $\psi$ is assigned as a material property of the rock.

Equation 3.3 shows how the damage affects the elastic strength of the rock.

$$E = (1-d)E_0 \quad (3.3)$$

where E is the current and $E_0$ the original Young's Modulus.

Equation 3.4 describes the effect of damage on the plastic strength in a modified Drucker-Prager constitutive model.

$$A = \eta(1-d)A_0 \quad (3.4)$$

where A and $A_0$ are the current and initial friction parameters, and $\eta$ is a hardening parameter Equation 3.5 describes how hardening occurs as plastic strain increases $$\eta = \eta_0 + (1-\eta_0)\frac{\epsilon^{eqp}}{B+\epsilon^{eqp}} \quad (3.5)$$

where $\eta$ and $\eta_0$ are the current and initial hardening parameters, $\epsilon^{eqp}$ is the equivalent plastic strain as in equation 3.2, and B is another material parameter that varies with the type of rock.

Savings in computing resource, and therefore an increase in the simulation time efficiency and/or budget efficiency are especially valuable in optimizing well placements and schedules, performing risk analysis, and other oilfield operations. Neural network methods may be employed to interpolate numerical data of various types. There are several ways neural networks can be used in geomechanical modeling where training the neural network to calculate a set of output data from a set of input data eliminates or reduces laborious human involvement or excessive computational expense. In one example of processing input data, data relating to stress, material properties, etc. for a geomechanical simulator may be assigned as inputs (e.g., initial inputs) to a neural network for outputting consistent sets of values (e.g., initial values) to be assigned to individual grid blocks in an array representing a portion of the oilfield modeled by the geomechanical simulator. In another example of calculating strain and plasticity, loads and elastic stiffness matrix for stress equations at a given time may be assigned as inputs to a neural network for outputting plastic and elastic strain throughout the array of grid blocks. The plasticity is calculated without iteration to achieve increase in simulation speed. In yet another example of analysis of well placements and schedules, various choices of well trajectory and production or injection schedule may be assigned as inputs to a neural network for outputting new simulation results for revised parameters. Results are calculated without the need for full simulation, hence much quicker in simulation time. In still another example of re-simulation due to revised data, changes in material properties or observed stress/strain may be assigned as inputs to a neural network for outputting new simulation results with revised properties.

Furthermore, the neural networks may also be used to reveal patterns in the plasticity that would not be easily discernible from standard analysis. Therefore, the user is alerted to similarities and differences in plastic behavior. In some applications (such as interpolation of measurements to assign initial stresses to each grid block), the expertise and involvement from a user may be largely reduced to minimize required user training and workflow stages.

Figure 9:
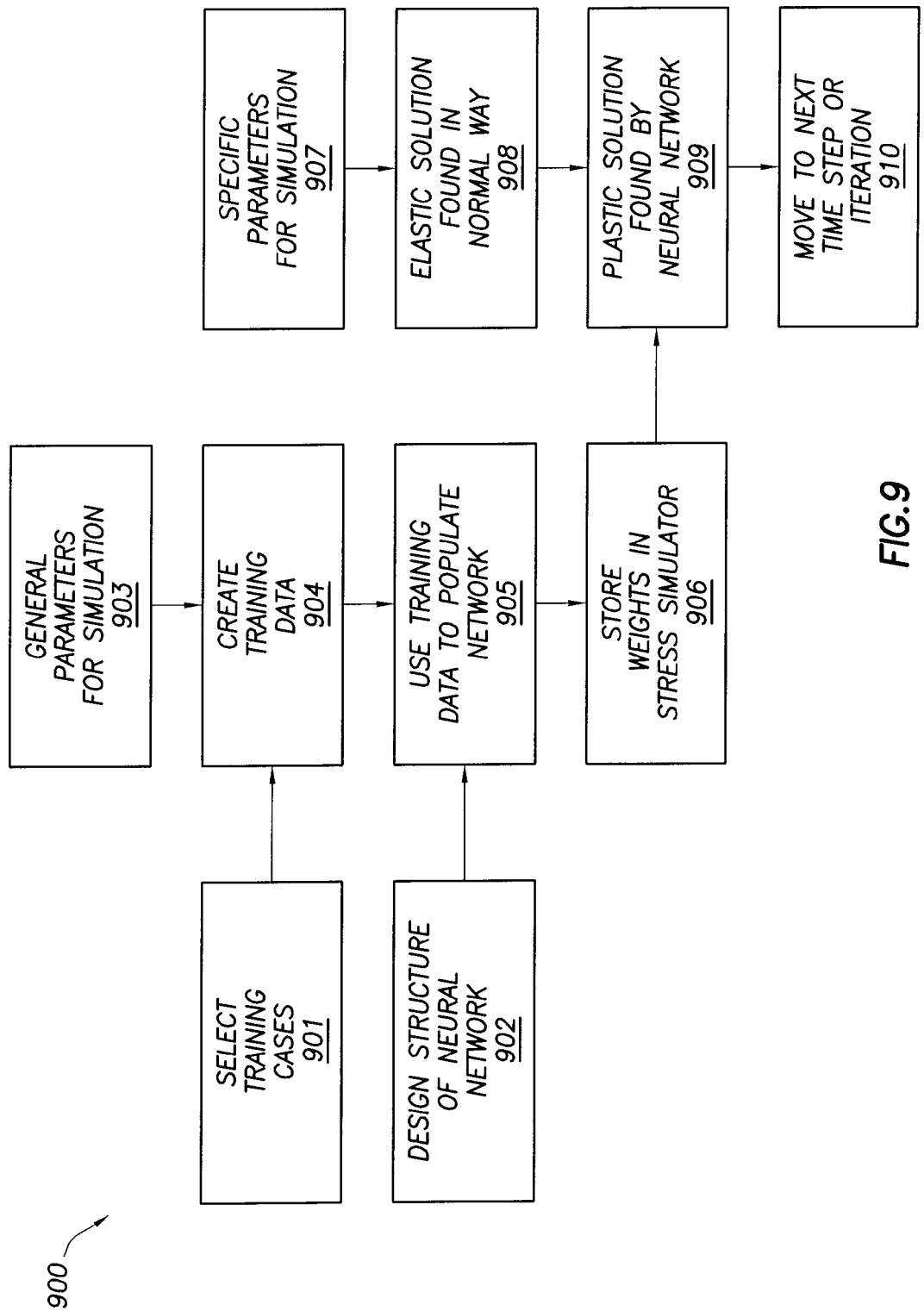
FIG. 9 shows an example schematic diagram of using neural network for modeling the oilfield in accordance with one or more embodiments.

FIG. 9 shows a workflow (900) using a neural network for modeling the oilfield. Initially, training cases for the neural network are chosen (Element 901) and general simulation parameters are provided (Element 903). Sample full simulations are performed to create training data for the neural network (Element 904). The layout of the neural network (e.g., number of layers and network nodes) are chosen (Element 902). Accordingly, the neural network is populated using training data such as elastic strain (Element 905). The resultant network parameters are then stored in the geomechanical simulator (e.g., a stress simulator) (Element 906). Once the geomechanical simulator is configured with the neural network, specific simulation parameters (e.g., for an oilfield client simulation) may be provided (Element 907) for performing the geomechanical simulation using elastic properties to find trial strain (Element 908). At this point, instead of using full simulation to obtain the final results, the neural network may be used to calculate converged stress, elastic and plastic strain without iteration required for the full simulation (Element 909). Estimates of accuracy compared to full simulation may also be provided by the neural network. Subsequently, the procedure may move to next simulation time step or iteration in the geomechanical simulation flow (Element 910).

A standard geomechanical study uses input data collected and processed by the user before being applied in a series of simulations. Results are then analyzed, reports written, and finally decisions made on what actions to take in the field. This workflow may be executed at much greater speed, enabling the data to be imported directly from field measurements and the results to be reported directly to the engineers operating equipments in the field. Decisions (e.g. drilling of wells or operating pressures for wells) may then be made using real-time data from measuring tools.

Figure 10:
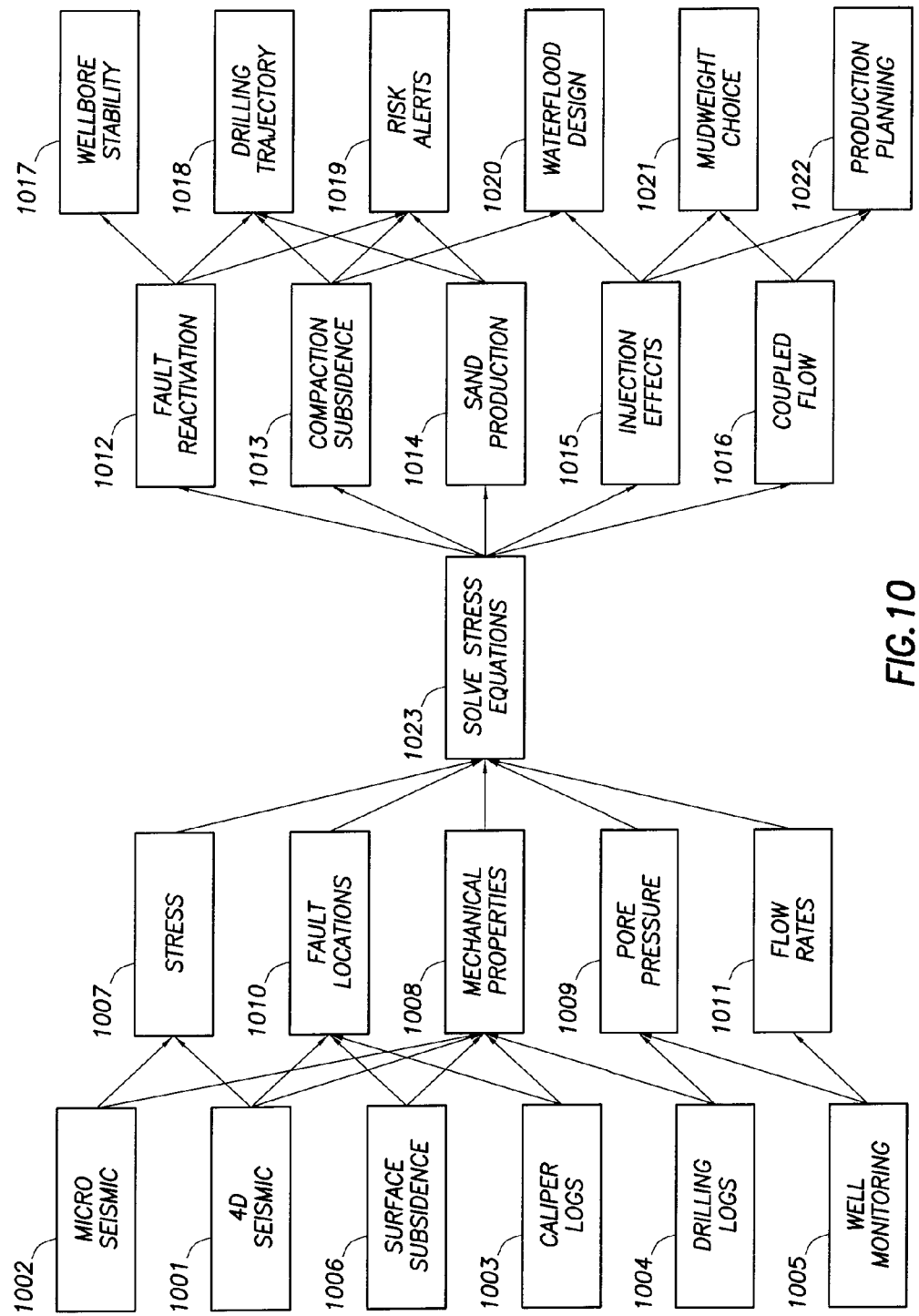
FIG. 10 shows an example schematic diagram of using monitoring data for modeling the oilfield in accordance with one or more embodiments.

FIG. 10 shows a schematic diagram using monitoring data for modeling the oilfield. As shown in FIG. 10, data that is likely to be available in such circumstances may include time-lapse seismic information (Element 1001), micro-seismic observations (Element 1002), caliper log data (Element 1003), drilling logs (Element 1004), flow rates and pressures from wells (Element 1005), surface subsidence and compaction measured at the wells (Element 1006), etc. This information may be transformed automatically into the required inputs (e.g., initial stresses (Element 1007), mechanical properties (Element 1008), initial pore pressures (Element 1009), fault locations (Element 1010), flow rates (Element 1011), etc.) for geomechanical simulations (Element 1023) with suitable settings for getting results in the required time-frame. Facilities may also be added to amend simulations in progress, or adjust the results for existing simulations to allow for revised parameters. Finally, the outputs from geomechanical simulations (e.g., fault reactivation (Element 1012), compaction subsidence (Element 1013), sand production (Element 1014), injection effects (Element 1015), coupled flow (Element 1016), etc.) may be converted back automatically into the type of parameters the measurement tools detect, such as wellbore stability prediction (Element 1017), drilling trajectory (Element 1018), risk alerts (Element 1019), water flood design (Element 1020), mud weight choice (Element 1021), production planning (Element 1022), etc.

In addition, the production of real-time simulation results may be integrated with risk and hazard alerts to field operators. For example, if drilling in a certain direction is likely to compromise wellbore stability or risk fault reactivation, the drilling team can be warned.

FIG. 11.1 shows a schematic view of an example yield surface diagram for modeling the oilfield. When a geomechanical simulator calculates elastic and plastic strain, it may ensure that the stress at each point in the array of simulation grid blocks is consistent with the constitutive model of plastic yielding. FIG. 11.1 shows an example yield surface diagram for modeling the oilfield. As shown in FIG. 11.1, the vertical axis represents deviatoric stress (q) and the horizontal axis represents mean stress (p). In this two dimensional depiction, two example yield surfaces are shown as curve (1101) and curve (1102). When plastic deformation is occurring, the stress remains on the curve (e.g., $A_{Final}$ and $B_{Final}$ on the final yield surface (1101)). or move along with the curve through the simulation process (e.g., the initial yield surface (1102) may move to the final yield surface (1101)). If a calculated stress in the simulation lies outside the curve, the simulation solution is unsatisfactory and described as unconverged.

To calculate the converged stress, viscoplastic method may be used, which first calculates a trial stress assuming total elastic behavior. When plastic deformation is occurring, that trial stress lies outside the yield surface. For example, trial stress for two different locations in the simulation grid block array are shown in FIG. 11.1 as $A_1$ and $B_1$ of the locations (1103) and (1104), respectively. An iterative procedure may then adjust the plastic and elastic strain components of the total strain until substantially all stresses in the simulation grid block array lie on or inside the yield surface, and the simulation solution is converged. An example of this iterative procedure is shown as successive stress estimates of $A_1$, $A_2$, $A_3$, $A_{Final}$ in locations (1103) and $B_1$, $B_2$, $B_3$, $B_{Final}$ in locations (1104). The process of making successive stress estimates may be called viscoplastic time-stepping (or pseudo-time-stepping), although there is no connection with passage of time in the model or the real world. The pseudo-time-stepping is distinct from the simulation time step described with respect to FIG. 3 above.

In some examples, the convergence of stresses may be difficult in cases where the yield surface is moving through the pseudo-time-stepping procedure. As plastic strain is increased during the convergence process, parts or all of the yield stress may increase or decrease. The iterative process must be stable as well as efficient for substantially all possible changes in the yield surface, otherwise stresses at some points of the simulation grid block array may fail to converge (e.g., oscillate or diverge).

FIGS. 11.2 and 11.3 are flow charts depicting a method of determining pseudo-time-steps for viscoplastic method in modeling the oilfield. This method may be used in Element 304 through Element 307 in the workflow (300) in FIG. 3 above. Generally as shown in FIG. 11.2, portions of the oilfield may be modeled based on a geomechanical model having a viscoplastic method using iterations for achieving convergence (Element 1105). During the simulation, a current stress may be obtained according to the viscoplastic method (Element 1106). An incremental change in the plastic strain is then determined for at least one of the iterations based on a distance of the current stress (i.e., unconverged) from a yield surface (which is often moving) of the viscoplastic method (Element 1107).

FIG. 11.3 describes the method in more detail. Here, current elastic stiffness matrix may be formed for each simulation grid block in the geomechanical model (Element 1111). A vector of loads may also be formed for each nodal freedom (Element 1112). Trial stresses and strains may be solved assuming elastic condition (Element 1113). Yield function (F) and plastic potential (Q) may be determined for each finite element gauss point in the array of simulation blocks (Element 1114). Convergence may be checked to determine which points may lie on or outside current plastic yield surface (Element 1115). A pseudo-time-step may then be determined for points outside the yield surface (Element 1116), based on equations 4.1 and 4.2 below. As a result, a portion of strain may be assigned as plastic strain, for example based on equation 4.3 below (Element 1117). The direction of plastic strain may be governed by a plastic potential surface and updated stress may be calculated accordingly (Element 1118). The yield surface may then be updated (Element 1119) and the method advances to (Element 1114) for next iteration. Over successive iterations, the stress for every yielding point may approach the yield surface. When convergence is reached within a specified tolerance, the method may move to the next step, for example the next simulation time step in the simulation time period (Element 1120).

More details of viscoplastic method based on the pseudo-time-stepping as depicted in FIG. 11.3 are described in equations 4.1 through 4.3 below as an example. In other examples, the exact equations may vary and depend on the particular constitutive model in use.

Equation 4.1 defines a matrix A that relates viscoplastic strain $\epsilon^{vp}$ to change in stress $\sigma$.

$$A = \left(\frac{\partial \dot{\varepsilon}^{vp}}{\partial \sigma}\right) = \gamma\left\{\left(\frac{\partial F}{\partial \sigma}\right)^T\left(\frac{\partial Q}{\partial \sigma}\right) + F\left(\frac{\partial^2 Q}{\partial \sigma^2}\right)\right\} \quad (4.1)$$

where F is the yield function, $\gamma$ is the fluidity parameter, and Q is the plastic potential.

Equation 4.2 determines a maximum stable pseudo-time-step $\Delta t_c$ based on the maximum eigenvalue $\Lambda$ of the matrix A.

$$\Delta t_c = \frac{2\Xi}{\Lambda} \quad (4.2)$$

where $\Xi$ is a parameter that may be less than or equal to 0.5 for stable, non-oscillatory convergence.

Equation 4.2 determines the incremental change assigned in the plastic strain.

$$\delta \varepsilon_{vp} = \gamma F\left(\frac{\partial Q}{\partial \sigma}\right)\Delta t_c \quad (4.3)$$

where $\delta\epsilon_{vp}$ represents the incremental change in the plastic strain corresponding to the pseudo-time-step $\Delta t_c$.

The steps of portions or all of the processes discussed above may be repeated as desired. Repeated steps may be selectively performed until satisfactory results achieved. For example, steps may be repeated after adjustments are made. This may be done to update the simulator and/or to determine the impact of changes made.

The data input, coupling, layout, and constraints defined in the simulation provide flexibility to the simulation process. These factors of the various simulators are selected to meet the requirements of the oilfield operation. Any combination of simulators may be selectively linked to create the overall oilfield simulation. The process of linking the simulators may be re-arranged and simulations repeated using different configurations. Depending on the type of coupling and/or the arrangement of simulators, the oilfield simulation may be selected to provide the desired results. Various combinations may be tried and compared to determine the best outcome. Adjustments to the oilfield simulation may be made based on the oilfield, the simulators, the arrangement and other factors. The process may be repeated as desired.

Figure 12:
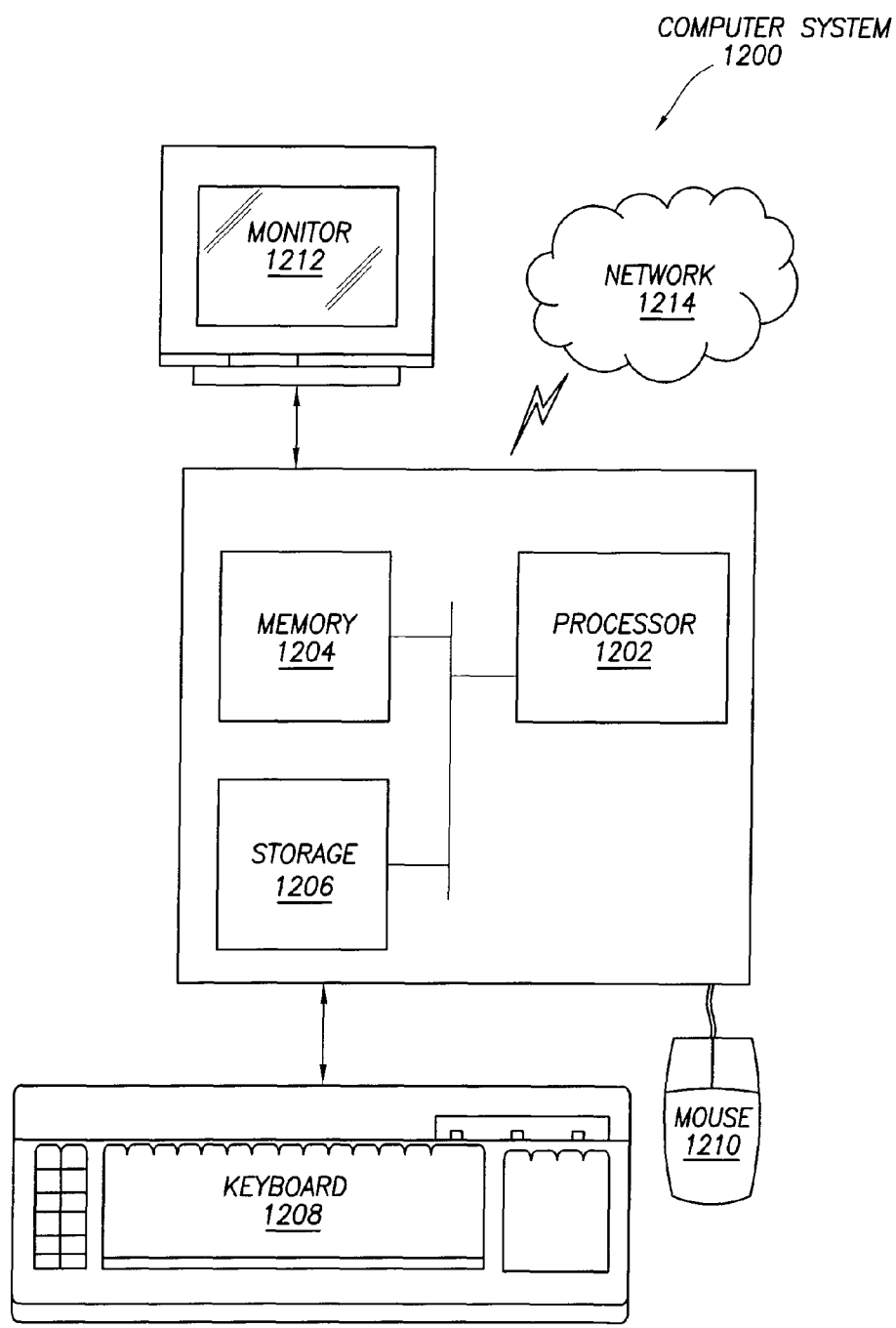
FIG. 12 depicts a computer system in accordance with one or more embodiments of the quality measure for data context service.

Embodiments of the fully coupled simulation for fluid flow and geomechanical properties in oilfield simulation operations may be implemented on virtually any type of computer regardless of the platform being used. For example, as shown in FIG. 12, a computer system (1200) includes one or more processor(s) (1202), associated memory (1204) (e.g., random access memory (RAM), cache memory, flash memory, etc.), a storage device (1206) (e.g., a hard disk, an optical drive such as a compact disk drive or digital video disk (DVD) drive, a flash memory stick, etc.), and numerous other elements and functionalities typical of today's computers (not shown). The computer (1200) may also include input means, such as a keyboard (1208), a mouse (1210), or a microphone (not shown). Further, the computer (1200) may include output means, such as a monitor (1212) (e.g., a liquid crystal display (LCD), a plasma display, or cathode ray tube (CRT) monitor). The computer system (1200) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (1200) includes at least the minimal processing, input, and/or output means necessary to practice embodiments of the quality measure for data context service.

Further, those skilled in the art will appreciate that one or more elements of the aforementioned computer system (1200) may be located at a remote location and connected to the other elements over a network (1214). Further, embodiments of the fully coupled oilfield simulation may be implemented on a distributed system having a plurality of nodes, where each portion of the embodiments (e.g., various modules of FIG. 4) may be located on a different node within the distributed system. In one embodiment, the node corresponds to a computer system. Alternatively, the node may correspond to a processor with associated physical memory. The node may alternatively correspond to a processor with shared memory and/or resources. Further, software instructions for performing embodiments of the quality measure for data context service may be stored on a computer readable medium such as a compact disc (CD), a diskette, a tape, a file, or any other computer readable storage device. This description is intended for purposes of illustration only and should not be construed in a limiting sense.

The nomenclature used in the equations above is summarized in TABLE 1 below.

TABLE 1

| Symbols | |
|---|---|
| S | saturation |
| B | volume formation factor |
| c | compressibility |
| n | porosity |
| f | fractional flow |
| R | ratio |
| p | pressure |
| a | Blot's coefficient |
| v | velocity vector |
| M | mobility tensor |
| K | permeability |
| λ | permeability multiplier |
| ψ | rock material property |
| η | hardening parameter |
| T | time |
| E | Young's Modulus |
| φ | porosity |
| Ξ | time stepping parameter |
| F | failure surface |
| Q | potential surface |
| Λ | Eigen value |
| Subscripts | |
| w, o, g | water, oil, gas |
| s | gas oil |
| r | relative |
| c | capillary |
| t | total |

TABLE 1-continued

| | |
|---|---|
| p | plastic |
| 0 | original/initial |
| v | volumetric |
| Superscripts | |
| ' | derivative |
| eq | equivalent |
| p | plastic |
| + | dilitant volumetric |

It will be understood from the foregoing description that various modifications and changes may be made in the embodiments of the fully coupled oilfield simulation without departing from its true spirit. For example, the simulators, couplings and arrangement of the system may be selected to achieve the desired simulation. The simulations may be repeated according to the various configurations, and the results compared and/or analyzed.

This description is intended for purposes of illustration and should not be construed in a limiting sense. The scope of the fully coupled oilfield simulation should be determined by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A computer system for modeling an oilfield having a subterranean formation and an underground reservoir therein, comprising:
    a repository storing a geomechanical model for representing at least a portion of the subterranean formation and the reservoir, the geomechanical model comprising a stress equation and a fluid flow equation;
    a processor and memory storing instructions which when executed by the processor cause execution of functionalities for:
    combining the stress equation and the fluid flow equation into a matrix equation by:
    converting a combination of the stress equation and the fluid flow equation into an integral form; and
    converting the integral form into a discrete form based on a finite element method;
    solving the stress equation and the fluid flow equation simultaneously;
    configuring a neural network associated with the geomechanical model; and
    calculating stress and elastic and plastic strains at various locations using the neural network.

2. The computer system of claim 1,
    wherein the fluid flow equation is formulated in a hyperbolic form;
    wherein the matrix equation comprises a plurality of coupled equations; and
    wherein the plurality of coupled equations are solved simultaneously.

3. The computer system of claim 2, wherein the hyperbolic form comprises:

$$A_i^* \frac{\partial s_w}{\partial t} + B_i^* \frac{\partial s_g}{\partial t} + C_i^* \frac{\partial p_w}{\partial t} + D_i^* \frac{\partial \varepsilon_v}{\partial t} + E_i^* v_t \cdot \nabla s_w + F_i^* v_t \cdot \nabla s_g = Q_i^*,$$

where t represents time, $S_w$ represents saturation of water, $S_g$ represents saturation of gas, $p_w$ represents water phase pressure, $\epsilon_v$ represents volumetric strain, $v_i$ represents phase velocity, $Q_i$ represents flow rate, and at least one selected from a group consisting of $A_i^*$, $B_i^*$, $C_i^*$, $D_{ii}^*$, $E_i^*$ and $F_i^*$ represents a parametric function of at least one selected from a group consisting of fluid compressibility, volume formation factor, gas-oil ratio, Biot's coefficient, capillary pressure, porosity, pressure and saturation.

4. The computer system of claim 2, wherein the fluid flow equation is formulated in a hyperbolic form based on a substitution equation $V_i = f_i v_y + g_i \nabla s_w + h_i \nabla s_g$, where at least one selected from a group consisting of $f_i$, $g_i$ and $h_i$ represents a parametric function of at least one selected from a group consisting of fluid compressibility, volume formation factor, gas-oil ratio, Biot's coefficient, capillary pressure, porosity, pressure and saturation.

5. The computer system of claim 1, the instructions when executed by the processor further cause execution of functionalities for:
    configuring the neural network for at least one selected from a group consisting of:
    processing input data, by assigning data related to stress and material properties as inputs to the neural network and generating a set of values to be assigned to an array of individual grid blocks representing a portion of the oilfield modeled by the geomechanical model;
    calculating strain and plasticity, by assigning loads and elastic stiffness matrix for stress equations at a given time as inputs to the neural network and generating plastic and elastic strain throughout the array of grid blocks representing the portion of the oilfield modeled by the geomechanical model;
    analyzing well placement and schedule, by assigning various choices of well trajectory and production and injection schedules as inputs to the neural network and generating simulation outputs for a revised set of parameters; and
    resimulating based on revised input data by assigning changes in material properties or observed stress and strain as inputs to the neural network and generating simulation outputs with revised properties.

6. The computer system of claim 1, the instructions when executed by the processor further cause execution of functionalities for:
    modeling the oilfield based on the geomechanical model comprising a viscoplastic model for calculating plastic strain based on a current yield surface;
    obtaining a current stress using the viscoplastic model;
    using a plurality of iterations for achieving convergence; and
    determining an incremental change in the plastic strain for at least one of the plurality of iterations, based on a distance of the current stress from the current yield surface;
    providing a matrix for representing a relationship between the plastic strain and change in stress; and
    determine a pseudo-time-step of the plurality of iterations based on a maximum eigenvalue of the matrix,
    wherein the matrix is represented by $$A = \left(\frac{\partial \dot{\varepsilon}^{vp}}{\partial \sigma}\right) = \gamma\left\{\left(\frac{\partial F}{\partial \sigma}\right)^T\left(\frac{\partial Q}{\partial \sigma}\right) + F\left(\frac{\partial^2 Q}{\partial \sigma^2}\right)\right\},$$

where A represents the matrix, and
wherein the pseudo-time-step is determined as $$\Delta t_c = \frac{2\Xi}{\Lambda},$$

where $\Lambda$ represents the maximum eigenvalue of the matrix and $\Xi$ is a parameter for achieving convergence.

7. The computer system of claim 6, wherein the incremental change in the plastic strain is assigned according to $$\delta \varepsilon_{vp} = \gamma F \left(\frac{\partial Q}{\partial \sigma}\right) \Delta t_c,$$

where $\delta \epsilon^{vp}$ represents the incremental change in the plastic strain, F represents a yield function, $\gamma$ represents a fluidity parameter, Q represents plastic potential, $\sigma$ represents stress and $\Delta t_c$ represents the pseudo-time-step.

8. A computer implemented method for modeling an oilfield having a subterranean formation and an underground reservoir therein, the method comprising:
  modeling, using a computer, the oilfield based on a geomechanical model comprising a viscoplastic model for calculating plastic strain based on a current yield surface;
  obtaining, using the computer, a current stress using the viscoplastic model;
  using a plurality of iterations for achieving convergence;
  determining, using the computer, an incremental change in the plastic strain for at least one of the plurality of iterations, based on a distance of the current stress from the current yield surface.

9. The method of claim 8, further comprising:
  providing a matrix for representing a relationship between the plastic strain and change in stress; and
  determine a pseudo-time-step for the plurality of iterations based on a maximum eigenvalue of the matrix,
  wherein the matrix is represented by $$A = \left(\frac{\partial \dot{\varepsilon}^{vp}}{\partial \sigma}\right) = \gamma \left\{ \left(\frac{\partial F}{\partial \sigma}\right)^T \left(\frac{\partial Q}{\partial \sigma}\right) + F\left(\frac{\partial^2 Q}{\partial \sigma^2}\right) \right\},$$

where A represents the matrix, and
wherein the pseudo-time-step is determined as $$\Delta t_c = \frac{2\Xi}{\Lambda},$$

where $\Lambda$ represents the maximum eigenvalue of the matrix and $\Xi$ is a parameter for achieving convergence.

10. The method of claim 9, wherein $\Xi$ is less than 0.5 for achieving stable and non-oscillatory convergence.

11. The method of claim 9, wherein the incremental change in the plastic strain is assigned according to $$\delta \varepsilon_{vp} = \gamma F \left(\frac{\partial Q}{\partial \sigma}\right) \Delta t_c,$$

where $\delta \epsilon_{vp}$ represents the incremental change in the plastic strain, F represents a yield function, $\gamma$ represents a fluidity parameter, Q represents plastic potential, $\sigma$ represents stress and $\Delta t_c$ represents the pseudo-time-step.

12. A computer implemented method for modeling an oilfield having a subterranean formation and an underground reservoir therein, comprising:
  modeling, using a computer, the oilfield based on a geomechanical model comprising a viscoplastic model for calculating plastic strain based on a current yield surface;
  calculating, using the computer, damage to the subterranean formation based on plastic strain;
  modeling sand generation based on damage;
  calculating, using the computer, permeability based on plastic strain and damage;
  modeling sand transportation based on the permeability;
  forecasting, using the computer, production based on the sand generation and the sand transportation.

13. The method of claim 12,
  wherein the damage is calculated according to $d = \epsilon_{vp}^+ + \psi \epsilon^{eqp}$, where d represents the damage, $\epsilon_{vp}^+$ represents dilitant plastic volumetric strain, $\epsilon^{eqp}$ represents equivalent plastic strain tensor, $\psi$ represents a rock material property associated with the subterranean formation, and
  wherein the permeability is calculated according to $A = \eta (1-d) A_0$ and $$\eta = \eta_0 + (1 - \eta_0) \frac{\varepsilon^{eqp}}{B + \varepsilon^{eqp}},$$

where A represents a current friction parameter, $A_0$ represents an initial friction parameter, $\eta$ represents a current hardening parameter, $\eta_0$ represents an initial hardening parameter, and B represents a second rock material parameter associated with the subterranean formation.

14. The method of claim 12, further comprising:
  obtaining a current stress using the viscoplastic model;
  using a plurality of iterations for achieving convergence; and
  determining an incremental change in the plastic strain for at least one of the plurality of iterations, based on a distance of the current stress from the current yield surface.

15. The method of claim 14, further comprising:
  providing a matrix for representing a relationship between the plastic strain and change in stress; and
  determine a pseudo-time-step of the plurality of iterations based on a maximum eigenvalue of the matrix,
  wherein the matrix is represented by $$A = \left(\frac{\partial \dot{\varepsilon}^{vp}}{\partial \sigma}\right) = \gamma \left\{ \left(\frac{\partial F}{\partial \sigma}\right)^T \left(\frac{\partial Q}{\partial \sigma}\right) + F\left(\frac{\partial^2 Q}{\partial \sigma^2}\right) \right\},$$

where A represents the matrix, and
wherein the pseudo-time-step is determined as $$\Delta t_c = \frac{2\Xi}{\Lambda},$$

where Λ represents the maximum eigenvalue of the matrix and Ξ is a parameter for achieving convergence.

16. The method of claim 15, wherein the incremental change is assigned according to $$\delta\varepsilon_{vp} = \gamma F\left(\frac{\partial Q}{\partial \sigma}\right)\Delta t_c,$$

where $\delta\epsilon^{vp}$ represents the incremental change in the plastic strain, F represents a yield function, γ represents a fluidity parameter, Q represents plastic potential, σ represents stress and $\Delta t_c$ represents the pseudo-time-step.

17. A computer implemented method for modeling an oilfield having a subterranean formation and an underground reservoir therein, comprising:
   obtaining, using a computer, a statistical size distribution of a plurality of pores located in the subterranean formation;
   establishing a fluid flow model based on an interconnected pipe network for representing the plurality of pores, the interconnected pipe network having network geometry determined based on the statistical size distribution;
   adjusting, using the computer, the interconnected pipe network based on a stress/strain change in the subterranean formation to generate an adjusted network geometry; and
   updating, using the computer, the fluid flow model based on the adjusted network geometry.

18. The method of claim 17, the interconnected pipe network comprising a pipe having a pipe diameter and a pipe length, the method further comprising:
   determining the pipe diameter and an average porosity based on the statistical size distribution;
   determining a pipe length based on the average porosity; and
   calculating permeability for the fluid flow model based on the pipe diameter and pipe length.

19. A computer implemented method for modeling an oilfield having a subterranean formation and an underground reservoir therein, comprising:
   modeling, using a computer, the oilfield based on a geomechanical model for representing at least a portion of the subterranean formation and the reservoir, the geomechanical model comprising a stress equation and a fluid flow equation;
   configuring, using the computer, a neural network associated with the geomechanical model, the neural network being configured for at least one selected from a group consisting of:
   processing input data, by assigning data related to stress and material properties as inputs to the neural network and generating a set of values to be assigned to an array of individual grid blocks representing a portion of the oilfield modeled by the geomechanical model;
   calculating strain and plasticity, by assigning loads and elastic stiffness matrix for stress equations at a given time as inputs to the neural network and generating plastic and elastic strain throughout the array of grid blocks representing the portion of the oilfield modeled by the geomechanical model;
   analyzing well placement and schedule, by assigning various choices of well trajectory and production and injection schedules as inputs to the neural network and generating simulation outputs for a revised set of parameters; and
   resimulating based on revised input data by assigning changes in material properties or observed stress and strain as inputs to the neural network and generating simulation outputs with revised properties.

* * * * *